United States Patent Office 3,032,051
Patented May 1, 1962

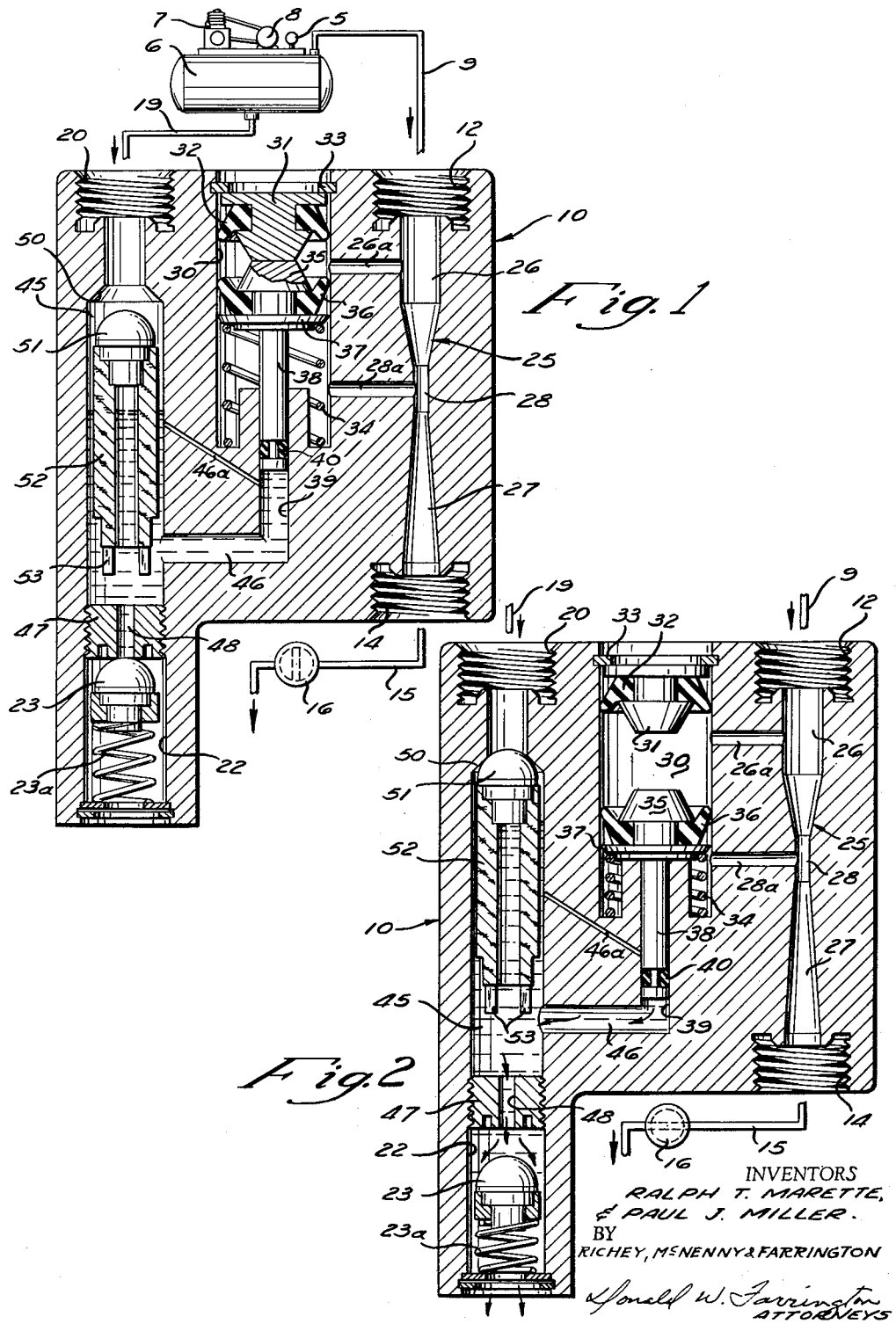

3,032,051
EXPULSION VALVE MECHANISM
Ralph T. Marette, Cleveland Heights, and Paul J. Miller, Maple Heights, Ohio, assignors to The Weatherhead Company, Cleveland, Ohio, a corporation of Ohio
Filed Feb. 25, 1959, Ser. No. 795,446
5 Claims. (Cl. 137—87)

Our invention relates to water expulsion mechanism for air systems and more particularly to a device arranged to drain and expel water from an air tank wherein the expulsion of the water is responsive to flow of air from the tank.

Our invention is useful in draining accumulated moisture from an air storage tank where air under pressure in the tank is used to operate various devices such as air ride cushions, air brakes and the like for vehicles. It will be understood as the description proceeds that the device is also well adapted for use in gas storage and use systems where fluid accumulates and should be separated from the gas.

When air is compressed the mass of water vapor present per unit volume in the air approaches the dew point and when this saturation point is reached condensation takes place, thus allowing water to accumulate in the bottom of the storage tank. If such accumulated water is not frequently removed from the tank it will eventually fill the storage tank. The presence of water in the air in the storage tank will also have a detrimental effect on the distribution system by causing corrosion, freezing and other adverse results.

In the event air under pressure is used to spray paint, the water if not removed from the system will mix itself with the paint. Where air systems are used on vehicles for air brakes, air ride cushions and the like, it is important that water from the air storage tank does not enter the distribution lines, the valves and small orifices common to such systems.

Numerous attempts have been made to provide devices which will remove the water from an air storage tank. Such prior art devices include manually operated valves and "automatic" arrangements where a drain valve is opened in response to intermittent flow through a use line from the storage tank. One of the disadvantages associated with prior art "automatic" devices is that the drain valve from the air storage tank is opened and closed in response to flow changes in a use line without regard as to whether or not there may be any water in the storage tank. In operation such prior art devices open the drain valve on the tank and exhaust air from the tank even though there is no water accumulation in the air storage tank.

It is among the objects of our invention to provide a water expulsion device for air storage tanks constructed and arranged so that the water drains by gravity from the air storage tank into a valve body and is discharged or expelled from the body without the loss of air from the storage tank through the drain line.

It is a further object of our invention to provide a water expulsion device wherein a venturi is placed in a use line from an air storage tank and the pressure differences across the venturi are utilized to operate a liquid discharge piston.

It is a further object of our invention to provide a liquid expulsion device for a gas system wherein liquid drains by gravity from the storage tank into a float chamber and after a predetermined quantity of liquid has accumulated in the float chamber the liquid will be discharged from the float chamber into atmosphere by means including a venturi in the gas system.

It is a further object of our invention to provide a liquid discharge device for a gas storage tank wherein the liquid is discharged into atmosphere by means developing a liquid pressure which exceeds the gas pressure in the storage tank.

Further objects and advantages relating to dependable operation, simplicity of construction, safety and low cost, will appear from the following description and the appended drawings, wherein:

FIG. 1 is a sectional view of the liquid expulsion apparatus and includes a diagrammatic showing of an air system for the environment of the apparatus.

FIG. 2 is a sectional view similar to FIG. 1 showing the position of the parts during the expulsion of water from the apparatus.

Referring to the drawings. Our invention is shown in an air system including an air storage tank 6, an air compressor 7 driven by a motor 8 and provided with an air use line 9. The expulsion valve body is indicated in its entirety as at 10 and includes a use inlet 12 adapted to be connected to the use line 9 and a use outlet 14 adapted to be connected to the use line 15. The line 15 is shown as provided with a valve 16 leading to the use apparatus such as an air ride system, air brakes or other air actuated device. The bottom of the air storage tank 6 is provided with a drain line 19 which leads to a drain inlet port 20 in the valve body. The arrangement is preferably one wherein water accumulating in the tank 6 will flow by gravity through the line 19 into the body 10 at the port 20. The valve body 10 is also provided with a liquid discharge port in the form of a cylindrical bore as at 22 leading to the atmosphere and having a spring biased relief valve 23 mounted in the bore.

At the right hand side of the body 10 a venturi, indicated in its entirety as at 25, is formed in the passageway leading between the ports 12 and 14. The entrance side of the venturi is indicated at 26 and the down side of the venturi is indicated at 27 with the throat or restriction of the venturi indicated at 28.

Centrally of the valve body 10 there is formed the cylinder 30 disposed generally parallel to the venturi. The upper end of the cylinder is provided with a closure 31 having a resilient seal 32 and a snap ring 33 to retain the closure 31 in the upper end of the cylinder. The cylinder 30 is also provided with an air piston assembly comprising a piston head 35, a piston sealing ring 36, a flange 37, and a stem 38. The stem 38 is guided in a vertically disposed bore 39 and the lower end of the stem 38 is provided with a sealing gasket 40 arranged within the bore 39 so that the bore 39 and the stem 38 function as a fluid discharge cylinder and piston assembly.

At the left-hand side of the body there is formed a float chamber 45 intermediate the drain inlet port 20 and the discharge port 22. The float chamber 45 is arranged within the valve body generally parallel to the piston 30 and the venturi 25. The float chamber 45 is connected by the transverse bore 46 with the bottom of the cylinder 39 so that as water flows in response to gravity down into the float chamber 45 it will also fill the cylinder 39 and the transverse bore 46. The bottom of the float 52 is provided with spaced legs 53 arranged to prevent the float from closing the outlet of the float chamber 45.

The lower end of the float chamber 45 includes a plug 47 apertured as at 48 in alignment with the relief valve member 23. The upper end of the float chamber 45 is reduced in diameter to provide a valve seat 50 arranged to receive a resilient valve closure member 51 carried by the buoyant float 52.

For purposes of illustration, we have shown the expulsion device in FIG. 1 in the position that the parts would assume with the use valve in 16 in the line 15 closed. We have also shown the float chamber as being substantially filled with water which has drained by gravity from the storage tank 6 by way of line 19. It will be understood that water may continue draining into the float chamber and that the float 52 will rise until the resilient closure member 51 carried thereby engages the valve seat 50. Assuming the condition as just described and assuming that the valve 16 is opened so as to use air supplied by the tank 6 the piston spring 34 which has heretofore held the piston assembly upwardly with the head 35 thereof in engagement with the lower surface of the member 31 is overcome by the pressure difference on opposite sides of the piston head assembly. The chamber above the piston 35 and its sealing ring 36 is in communication with the upper side of the venturi 26 by way of the transverse bore 26a. The chamber below the piston is in communication with the throat 28 of the venturi by way of transverse bore 28a. In response to air flow through the venturi the pressure on the under side of the piston assembly 35—36—37 is reduced by reason of the connection of the throat of the venturi and at the same time there is a relative increase in pressure at the upper side of the piston assembly 35—36—37 by reason of the bore 26a leading to the entrance side of the venturi. The pressure differential is effective to move the piston assembly and the stem 38 downwardly against the bias of the spring 34 when the valve 16 is opened. The downward movement of the stem 38 in the bore 39 firmly seats the valve member 51 at the top of the float chamber and thereafter overcomes the bias of relief valve spring 23a so as to open the relief valve 23 and expel the water to atmosphere. The water is discharged by way of port 48 at the bottom of the float chamber and the bore 22 beneath the check valve 23.

The arrangement of the parts in FIG. 2 illustrates the position of the moving components at the conclusion of the water expelling cycle. It will be understood that change in the flow through the use line 15 or closing of the valve 16 in the use line may restore the piston assembly 35—36—37 to the position shown in FIG. 1. It will also be understood that the float 52 will approach to the position of FIG. 1 inasmuch as the water in the float chamber has been reduced by the quantity expelled.

It will be understood that the air storage tank 6 may be provided with the usual pressure gauge 5 and assuming that it is desired to maintain the air tank pressure at about 300 pounds per square inch, the check valve 23 and the spring 23a are designed to exert a force of between 350 to 400 pounds per square inch at the opening 48 in the bottom of the float chamber. If the tank pressure should exceed the setting of the valve 23 it will function as a relief valve for excess tank pressure. It will also be appreciated that in order for the water to be expelled the piston assembly must develop a fluid pressure in the float chamber exceeding the setting of the valve 23.

Those skilled in the art will appreciate that the pressure drop in the venturi will be determined by the design and proportions of the venturi and the rate of flow at a given pressure. We have found that with a flow of about two cubic feet per minute through the use line a 50 pound per sqare inch differential across the piston may be obtained. With such flow and pressure differential we have found that the ratio between the area of the piston assembly 35—36—37 and the area of the smaller piston provided by stem 38 should be in the nature of 10 to 1. Although with such proportions a fluid pressure of about 350 to 400 pounds per square inch will be available to open the valve 23, the spring 23a is designed to provide a closing pressure exceeding tank pressure. The closing pressure of the spring 23a is less than the fluid pressure developed by movement of the plunger 38. The design compensates for friction between the pistons and cylinders and the proportions described result in a fast action quickly and positively expelling water from the valve body 10. Manifestly, variations in the data indicated here for an operative device would require differences in dimensions of the parts without substantially changing the mode of operation.

To prevent the entrapment of air in the cylinder 39 beneath the plunger 38, a transverse vent line 46a is provided. The line 46a permits air to escape from the cylinder 39 into the space above the liquid level in the float chamber 45 and accordingly there is no air cushion beneath the plunger 38 when the piston is moved to discharge liquid from the valve body.

From the foregoing description of the operation of the device it will be understood that a restriction in the use line will perform substantially the same operation as the venturi. A nozzle, orifice or any other type of restrictor may be utilized to obtain a suitable pressure drop of sufficient magnitude to actuate the mechanism. Accordingly the term "venturi" as used herein is intended to cover a passageway having a restriction and an entrance portion in the passageway upstream from the restriction. A true venturi having the tapered inlet 25, the throat 28 and the outlet 27 provides more complete recovery and is more efficient than a mere restriction in a straight pipe due to the turbulence in the fluid stream following the restriction.

It will be appreciated by those skilled in the art that a diaphragm or bellows may be arranged to perform the functions of the piston assembly 35—36—37. Accordingly the term "piston" as used herein embraces such diaphragm and bellows.

Although the preferred form of our device has been described in connection with the removal of water from a pressure tank, it will be understood that our apparatus is suited for the separation of liquids of different density. For example, a tank containing gasoline may have an accumulation of water in the bottom of the tank. A gravity separation of the gasoline and water occurs in the tank and by connecting the venturi and plunger actuation in the use line, the water will be progressively removed from the bottom of the tank.

Although we have shown and described one form of our invention in considerable detail, it will be understood that numerous modifications may be made therein without departing from the scope of the invention as defined in the following claims.

1. A water expulsion device for an air system having an air tank, said device comprising a liquid drainage line inlet adapted to be connected to the bottom of said tank, a float chamber connected to said drainage line inlet, a normally-open float-operated valve at said drainage line inlet, said float chamber having an outlet, a normally-closed check valve at said outlet, an air cylinder and piston, a liquid cylinder and piston in communication with said float chamber, said first-named piston being connected to said second-named piston for joint actuation, a venturi having an entrance portion and a throat, a passageway leading from the entrance portion of the venturi to one side of said air piston, a passageway leading from the throat of the venturi to the other side of said air piston, and a use line inlet adapted to be connected to said tank and leading into said entrance portion of said venturi, said pistons being moved in response to a pressure difference between said entrance portion and said throat of the venturi to close said float-operated valve at said drainage line inlet and to force open said check valve at said outlet so as to discharge liquid from said float chamber.

2. An explusion valve for an air system having an air storage tank and a use line leading from the tank, said valve comprising a body having a use inlet adapted to be connected to said use line and a use outlet, a downwardly extending venturi passageway formed between said use inlet and use outlet with the entrance portion of the venturi adjacent the use inlet, a cylinder bore in the body arranged generally parallel to the venturi, a cylinder closure member at the top of said cylinder bore, a piston mounted in said cylinder bore, a passageway leading from the entrance side of the venturi into the cylinder bore above said piston, a passageway formed in the valve body leading from the throat of the venturi to said cylinder bore at the underside of said piston, a liquid collecting chamber in said body disposed generally parallel to said venturi, one portion of said chamber comprising a float chamber and another portion of said chamber comprising a cylinder, a float in said float chamber, said float chamber at its upper end having an inlet adapted to be connected to the bottom of said storage tank to conduct liquid from the bottom of the tank into the liquid collecting chamber, a valve carried by said float and positioned to close said inlet to the float chamber when the liquid level in the float chamber rises to a predetermined level, an outlet passageway at the bottom of the float chamber and a pressure relief valve normally biased to close said passageway, and a plunger in the cylinder portion of the liquid collecting chamber, said plunger being operably connected to said piston whereby the piston is moved in response to air flow through the venturi and the plunger moved thereby raises the liquid level in the float chamber to said predetermined level and expels the liquid from the liquid collecting chamber against the bias of said pressure relief valve.

3. A water expulsion device for an air system having an air tank, said device comprising a liquid drainage line inlet adapted to be connected to the bottom of said tank, a float chamber connected to said drainage line inlet, a float valve in said float chamber adapted to close said inlet when the liquid level in said float chamber rises, an outlet leading from said float chamber, a normally-closed outlet check valve at said outlet, an air cylinder and piston, a liquid cylinder communicating with said float and chamber piston, said first-named piston being connected to said second-named piston for joint actuation, said device including a passageway for air flow, a venturi in said passageway having an entrance portion and a throat, a conduit leading from the entrance portion of the venturi to one side of said air piston, a conduit leading from the throat of the venturi to the other side of said air piston, and a use line inlet leading into the entrance portion of said venturi whereby, in response to the venturi pressure difference during flow through the use line inlet, said pistons are moved to force open said outlet valve and to raise said float valve to close said inlet.

4. An expulsion valve for air systems having an air storage tank and a use line leading from the tank, said valve comprising a body having a use inlet adapted to be connected to the use line and a use outlet, a venturi formed in the body between said use inlet and use outlet, the entrance portion of the venturi being adjacent the use inlet, an air cylinder bore in the body arranged generally parallel to the venturi, a cylinder closure member at the top of said cylinder bore, an air piston mounted in said cylinder, a conduit leading from the entrance side in said cylinder above said air piston, a conduit formed in the valve body leading from the throat of the venturi to said air cylinder at the under side of said piston, a liquid collecting chamber in said body disposed generally parallel to said air cylinder, one portion of said chamber comprising a float chamber and another portion of said chamber comprising a water cylinder, a float in said float chamber, an inlet to said float chamber adapted to be connected to the bottom of said storage tank to conduct liquid from the bottom of the tank into the liquid collecting chamber, a float valve carried by said float and positioned to close said inlet when the liquid in said float chamber reaches a predetermined level, a water discharge port at the bottom of the float chamber and a pressure relief valve normally biased to close said port, and a plunger in the water cylinder portion of the liquid collecting chamber, said plunger being operably connected to an air piston whereby, when the air piston is moved in response to air flow through the venturi, the plunger is moved thereby expel the liquid from the liquid collecting chamber through said water discharge port against the bias of said pressure relief valve and raises the liquid level in said float chamber to said predetermined level so that said float valve closes said inlet to the liquid collecting chamber.

5. In a fluid system having a source with two fluids of different densities under pressure, a fluid expulsion device for the higher density fluid comprising a collection chamber for the higher density fluid having an inlet connected to said source and an outlet, a flow passage for the lower density fluid having an inlet connected to said source and having means therein for producing a pressure differential as a result of the flow therethrough of said lower density fluid, fluid motor means operatively connected to said pressure differential during the flow of the lower density fluid through said flow passage and movable in response to such pressure differential, a bore communicating with said collection chamber, a plunger slidable in said bore and operatively connected to said fluid motor means to expel the higher density fluid from said collection chamber through said outlet in response to the flow of the lower density fluid through said flow passage, said plunger having a substantially smaller cross-sectional area acting against the higher density fluid in said bore than the cross-sectional area of said fluid motor means which is operatively connected to said pressure differential resulting from the flow of the lower density fluid through said flow passage, said plunger applying to the higher density fluid in said bore a pressure which is substantially greater than said pressure differential operatively connected to said fluid motor means as a result of the flow of said lower density fluid through said flow passage and which is substantially greater than the fluid pressure at said source, first fluid responsive valve means controlling the inlet to the collection chamber and being biased open, and second fluid responsive valve means controlling the outlet from said collection chamber and being biased closed, the bias of said second valve means overcoming the opening force exerted thereon by the pressure of said source, the first valve means being constructed and arranged to be closed in response to filling of the collection chamber, the second valve means being constructed and arranged to open upon movement of said plunger while said first valve means is closed.

References Cited in the file of this patent

UNITED STATES PATENTS

| 2,192,769 | Dach | Mar. 5, 1940 |
| 2,323,341 | McGill | July 6, 1943 |

FOREIGN PATENTS

| 715,886 | Great Britain | Sept. 22, 1954 |